United States Patent [19]

Ganster et al.

[11] Patent Number: 4,917,028
[45] Date of Patent: Apr. 17, 1990

[54] FLUIDIZED BED PROCESS AND APPARATUS FOR CARRYING OUT THE PROCESS

[75] Inventors: Gerhard Ganster; Peter Steinrueck, both of Vienna, Austria

[73] Assignee: SGP-VA Energie-und Umwelttechnik Gesellschaft m.b.H., Vienna, Austria

[21] Appl. No.: 217,529

[22] Filed: Jul. 11, 1988

[30] Foreign Application Priority Data

Jul. 21, 1987 [AT] Austria .................. 1849/87

[51] Int. Cl.$^4$ .............................................. F23D 1/00
[52] U.S. Cl. ........................... 110/347; 110/245; 110/263; 431/7
[58] Field of Search ................ 110/245, 263, 347; 122/4 D; 422/139; 431/7, 170

[56] References Cited

U.S. PATENT DOCUMENTS

| | | | |
|---|---|---|---|
| 3,921,590 | 11/1975 | Mitchell et al. | 110/245 |
| 4,249,472 | 2/1981 | Mitchell | 110/245 |
| 4,535,706 | 8/1985 | Klaschka | 110/245 |

Primary Examiner—Edward G. Favors
Attorney, Agent, or Firm—Beveridge, DeGrandi & Weilacher

[57] ABSTRACT

The invention concerns a fluidized bed process for the gasification and combustion of fuels in differently fluidized zones separate from one another, the fuel being charged into a drying and pyrolysis zone with lower fluidization and solids transport downwards, the solids conveyed downwards being conveyed from the lower part of the drying and pyrolysis zone to the lower part of a combustion zone with higher fluidization and solids transport upwards and recirculating, after passing the combustion zone, from the upper zone thereof to the drying and pyrolysis zone, comprising that the solids are conveyed upwards in a combustion zone operated as a fast or turbulent fluidized bed beyond the bed height in the drying and pyrolysis zone and are subsequently forcibly deflected so that the solids drop down on the surface of the bed in the drying and pyrolysis zone as a shower of particles, that the fuel is metered into the shower of particles and that the gases emerging from the combustion zone are passed under use of their flowing pulse, optionally together with the gases rising from the drying and pyrolysis zone, into a turbulence zone in which a post-combustion is carried out, and further an apparatus for carrying out said process, said apparatus being a fluidized bed reactor with bed material circulating between two differently fluidized zones which are connected to one another in their lower parts, said reactor having a guidance means for the faster combustion zone extending in height beyond the slower bed material circulating zone and on whose upper end a solids deflection means for generating a shower of bed material dropping down on the slower zone is provided, comprising that a fuel feed is provided in the dropping area of the shower of bed material.

12 Claims, 3 Drawing Sheets

FLUIDIZED BED PROCESS AND APPARATUS FOR CARRYING OUT THE PROCESS

The invention relates to a fluidized bed process for the gasification and combustion of fuels in differently fluidized, mutually separate zones, the fuel being charged into a drying and pyrolysis zone with lower fluidization and solids transport downwards, the solids transported downwards being conveyed from the lower part of the drying and pyrolysis zone into the lower part of a combustion zone with higher fluidization and solids transport upwards and flowing back to the drying and pyrolysis zone from the upper part of the combustion zone after passing it, and to an apparatus for carrying out the process.

A process of this type and an apparatus for carrying it out are known from EP-A-202 215. This involves a vertical fluidized bed circulation around a separating wall due to different fluidization, with the fuel being metered into the bed flow directed downwards due to lower fluidization. It is stated that charging can be effected underneath or above the bed surface; the charging means mentioned are a.o. drop chutes. It is further stated that the areas of fuel charge can be operated with stoichiometrical oxygen deficiency so that the combustion can be carried out in steps. In other words, mainly drying and pyrolysis sets in in the slow fluidized bed.

In this process, the differently fluidized zones are interior zones of one single fluidized bed in which an interior circulation at constant bed height occurs across the section of the fluidized bed. The separation between the zones is effected by means of a separating wall whose upper edge ends far below the bed level. This process permits only slow bed material movement which is insufficient for an even fuel distribution over the bed within an acceptable period and thus does not permit an even cross section charge with rapidly degassing fuels. The known construction further does not permit gas discharge except over the bed surface common to all the zones, so that a concerted influencing of a selected zone in the fluidized bed is not possible, on the one hand, and unequal conditions prevail above the bed surface cross section, on the other hand, so that gas strands of various compositions occur.

It was now found that the disadvantages of this known art can be avoided with surprising results if the fluidized bed is formed in such a way that the lower connection between the differently fluidized zones remains the same, while the more strongly fluidized combustion zone is operated as a turbulent or fast fluidized zone so that the solids flow in this zone is carried upwards essentially beyond the bed level of the less fluidized drying and pyrolysis zone and then so forcibly deflected that a shower of particles into which the fuel is metered and mixed and by which the fuel is mixed in the bed material descends on the bed surface in the drying and pyrolysis zone, while the gases discharged from the combustion zone are deflected again after their separation from the solids so that a turbulent post-combustion zone is created in which preferably the gases discharged upwards by the less fluidized drying and pyrolysis zone are also burned.

The process according to the invention is thus mainly characterized in that the solids in a combustion zone operated as a fast or turbulent fluidized bed are conveyed upwards beyond the bed level in the drying and pyrolysis zone and are subsequently forcibly deflected so that the solids descend as a shower of particles on the surface of the bed in the drying and pyrolysis zone, that the fuel is metered into the shower of particles and that the gases discharged from the combustion zone, optionally together with the gases rising from the drying and pyrolysis zone, utilize their flowing pulses for entering a turbulent zone where a post-combustion is performed.

A combination of fast fluidized zone/slow fluidized zone with forcible deflection subsequent to the fast fluidized zone in connection with the combustion of powdered coke is known from DE-OS 27 36 493 which describes feeding coke powder into a combustion zone by means of a nozzle and operating a fast fluidized bed. At the end of the combustion zone, the stream of gas-/ashes is deflected downwards via baffles and the ashes drop into the interior space of the reactor where they are maintained as a slow fluidized bed so as to prevent their baking together and to facilitate their discharge. Part of the ashes is circulated as a solids stream. This has nothing in common with the process according to the invention in which the combustion is carried out in two steps and the fuel is metered into the slow fluidized bed.

The process according to the invention is preferably operated so that the vertical extension of the combustion zone is two to twenty times higher than the drying and pyrolysis zone. The gases emerging from the drying and pyrolysis zone can be withdrawn before they would mix with the gases emerging from the combustion zone.

According to the invention, the temperature in the post-combustion turbulence zone can be adjusted by a controlled distribution of the total amount of fluidization gas over combustion zone and drying and pyrolysis zone.

The temperature in the post-combustion turbulence zone can alternatively or additionally be controlled by adding an oxygen carrier gas in the area of the shower of particles.

As indicated, the combustion zone is operated as a fast or turbulent fluidized bed. The term "fast" is a technical term in the field of fluidized bed engineering and quite frequently also the term "turbulent" is used for this purpose. If a fluidized bed is operated "slowly", in the conventional manner, it constitutes a more or less dense zone with a surface which fluctuates due to gas bubbling, but is otherwise well defined. When increasing the gas throughput for "fast" operation, this surface can no longer be defined and it is assumed that in the "fast" state of the fluidized bed, strands or clusters of higher solids concentration are present in a continuum of lower solids concentration, with these strands being lifted to a less dense zone within the fluidized bed and subsequently dropping to a denser zone again so that a dynamic equilibrium is established. The following relevant publications are cited:

D. Geldart & M.J.Rhodes, From Minimum Fluidization to Pneumatic Transport - A Critical Review of the Hydrodynamics;

M.Kwauk, W.Ningde et al., Fast Fluidization at ICM; both in: Circulating Fluidized Bed Technology, P.Basu Pergamon Press, Halifax 1985;

J.M. Matsen, The Rise and Fall of Recurrent Particles: Hydrodynamics and Circulation;

M.Horio et al., Solid Distribution and Movement in Circulating Fluidized Beds, 2nd Int. Conf. on Circulating Fluidized Beds, March 1988, Compiegne;

L. Stromberg, Operational Modes for Fluidized Beds, Studsvik AG, Sweden, 1979.

In the process according to the invention, the slower fluidized bed is conveniently operated in the drying and pyrolysis zone in the vicinity of its point of mobility (loosening point), preferably with a fluidization number within the range of 1 to 5, preferably of 1 to 2. The fluidization number is the multiple of the so called mobilizing velocity according to Ergun |Chemical Engineering Progress 48 (1952) pages 89/94|.

The fluidized bed in the combustion zone is operated in particular with a fluidization number within the range of 10 to 140, in particular of 20 to 140, preferably of 70 to 140. The transition from slow to fast occurs approximately at a fluidization number of 10 to 15, as a function of, a.o., the particle size distribution in the bed. In special cases, the transition may set in at a fluidization number of as low as 4.

It is further preferred that 60 to 95 percent of the fluidization gas volume be injected into the combustion zone.

The process according to the invention is further conveniently performed in such a way that 20 to 200 kg $m^{-2}sec^{-1}$, based on the cross section of the combustion zone, of solids are recirculated from the combustion zone as a shower of particles.

The gases rising from the combustion zone, following forcible deflection together with the solids they entrain, are advantageously re-deflected in a manner known per se in an essentially horizontal direction, with the gases of high flow rate, preferably of 10 to 30 m $sec^{-1}$, directed to the lower range of the post-combustion turbulence zone.

In the post-combustion turbulence zone, where in each case fine solids particles and conveniently also the combustible gas discharged from the drying and pyrolysis zone, in particular after further addition of an oxygen carrier in the area of the shower of particles, are completely burned, a mean dwell time of 0.1 to 2 seconds is adjusted; longer dwell times are possible, but not preferred.

The invention thus relates to a process and an apparatus for the combustion or gasification of gaseous, liquid, pasty or solid substances, in particular of the most diverse waste materials such as garbage, fuel from waste material, sewage sludge and rejects from paper mills or waste oil in a fluidized bed which is divided into at least two areas communicating underneath. A first area is operated as a mildly fluidized bed, i.e. one fluidized just above the point of mobility. It serves as a fuel charging zone, a blowing out of fine particles or particles of low specific weight of large surface being prevented by the low flow rate maintained here. The second area is fluidized by the major part of the combustion air and a highly expanded fluidized bed is established here due to the high fluidization rate. As a result, the bed material is lifted to of from two to twenty times the height of the bed of the first slow zone and discharged from the area on the upper end of the separating wall.

Deflection means disposed at this site separate the emerging gas-solids mixture into a virtually particle-free gas stream and a solids stream directed downwards which descends onto the surface of the slow fluidized bed in this first zone in the form of a particle shower.

This shower of particles is used for mixing the fuel which is charged in free fall onto the bed surface of the first area into the fluidized bed and for preventing the rising of fuel particles. In the charging zone, the high heat energy transfer characteristic for fluidized beds causes fast drying and degassing at temperature within the range of about 500° to about 1000° C. (preferred of 650° to 900° C.).

As a result of the bed material movement established by the different fluidization and directed downwards, the fuel finally reaches the second area where combustion with oxygen excess takes place.

It is possible to circulate the bed material completely one time within a period between about 10 and 120 seconds. The heat transported by the bed material particles from the fast fluidized area suffices for maintaining the drying and gasification reaction under way in the area of the fuel charging zone. This effect makes it possible for the first time to burn fuels with a high content of volatile components, such as garbage or sewage sludge, even at low calorific value, such as 5.0 MJ/kg, autothermally, i.e. without the use of an additional fuel or preheating of air, within a fluidized bed. In fuels of higher calorific value, part of the heat is conveniently discharged via wall heating surfaces disposed in the fluidized bed.

The combustion gases emerging from the zone of high fluidization rate which usually still contain free oxygen preferably meet the pyrolysis gases rising from the first area above this area and are intimately mixed with them due to high flow rate and resulting high turbulence. In this area, the degasification products emerging from the first zone are completely burned within a mean dwell time of e.g. 0.1 to 2.0 seconds. The amount and energy content of the pyrolysis gases depend on the properties of the fuel, in particular on its content of volatile components, but also on the distribution of combustion air over the two areas. The amount of heat energy liberated in this postcombustion zone by the reaction of the degasification products can be adjusted, as a function of the fuel, to e.g. between 5 and 50 percent of the entire amount of heat energy generated by the fuel. This can be utilized, a.o., for increasing the temperature in the post-combustion zone to the level of more than 1200° C. legally prescribed in some countries for the thermal disposal of special waste material.

If such a high temperature is not required, it is of advantage to keep the combustion gases in this mixing zone to 800° to 900° C. in order to suppress the thermal formation of $NO_x$ and at the same time to assure complete combustion. This can be achieved by providing radiant heating surfaces, on the one hand, but also by an appropriate adjustment of the distribution of combustion air, on the other hand.

The process according to the invention derives its substantial improvement from experience gained with the known fluidized bed technologies. As evident from the preceding description, it is distinguished from the known fluidized bed combustion technologies by a novel type of fluid dynamics of the fluidized bed itself, on the one hand, and by a new configuration of the post-combustion zone, on the other hand. The following description shows how these features make the solution of the known problems connected with the operation of stationary or circulating fluidized beds possible.

Common to all types of fluidized beds is their high flexibility regarding fuels. Problems are generally caused by the high standard of fuel processing required. If the fuel is dropped from above onto the fluidized bed, such as it is conventional in stationary fluidized bed facilities, it must have a certain particle size distribution in order to assure an even distribution of the fuel. In this charging method, fine particles or light-weight material are entrained by the flue gases and thus not mixed into the fluidized bed. Since the behavior of the fluidized bed is similar to that of a liquid, there is the hazard of fuels of light specific weight floating on the fluidized bed.

These disadvantages can be remedied by the direct charging of the fuel into the fluidized bed, although this means that the fuel must be conveyed counter to the pressure of the fluidized bed. The operational safety of the sealing elements required for this purpose calls for the careful processing of the fuel, it is further not possible to assure an adequate distribution of the fuel in the fluidized bed in this way.

A direct charging of the fuel into the lower area of a fast fluidized bed is virtually only possible with degassed, high-grade fuels, such as coke powder according to DE-OS 27 36 493.

A further constellation of problems consists in the even distribution of the fuel and the additives for binding contaminants. An even distribution is the precondition for optimal combustion and reduction of emissions. If the fuel is charged in one point, the natural movement of the fluidized bed is normally not sufficient for obtaining adequate distribution. Various measures for the solution of this problem have been taken. The use of a belt charger makes high demands on the processing of the fuel. The use of pneumatic transport systems adding fuel to the bed at numerous points is limited to dry fuels of small grain size. Charging elements conveying the fuel directly into the bed can only supply the zones close to the walls, so that the dimension of the fluidized bed is greatly limited.

In order to be able to utilize the energy liberated by the combustion of the fuel in the fluidized bed and in order to obtain the full effect of the emission-reducing power of various absorbents, a fast admixing and good distribution of these substances in the fluidized bed is necessary. Various attempts at bed material circulation by the most diverse measures have been made (EP-A-202215;DE-OS 2804073). In all these processes, the moving rate of the bed material is too slow to effect an adequate distribution of rapidly degassing fuels over the bed cross section. It is further difficult to assure a reliable admixing of fine particles or particles of low specific weight into the fluidized bed.

According to the invention, the fuel as well as additives optionally required for the binding of contaminants, such as, e.g. $CaCO_3$, are charged in free fall into the space above the slow fluidized bed, entrained by the bed material circulation in the form of the particle shower and thus reliably mixed into the fluidized bed. There is generally slight underpressure at the charging orifice inside of the furnace so that no elaborate sealing elements are required. Jamming and wear due to inadequate processing of the fuel can thus virtually be excluded. The distribution required for an optimal reaction of the fuels is achieved according to the invention by the fast bed material circulation effected by the extremely differing fluidization of the two bed areas.

As a result of the good distribution of the fuel and the high turbulence in the post-combustion zone, there is no formation of strands of low $O_2$ and high CO content. At low construction height, a low oxygen content in the flue gas (4 to 6 % $O_2$) can be adjusted at the same time without impairing the complete combustion, which results in an improved firing effect.

Next to the effect on the fuel distribution, the dimension of the cross sectional surface also exerts an influence on the space requirement of the plant and the configuration of the means for the removal of incombustible coarse matter possibly introduced with the fuel from the fluidized bed. At a given firing output, a reduction of the cross sectional surface can only be achieved by an increase of the specific output, which in turn can be achieved in non-pressure operation only by an increase in the fluidization rate. The relevant known process (e.g. US-PS 4 538 549; US-PS 4 111 158) involving circulating fluidized beds necessitate great construction height to provide for adequate gas dwell times.

Known processes with interior bed material circulation not only show an essentially lower circulation rate, but do not provide any measures for assuring the complete post-combustion of volatile components and the at least partial utilization of the heat liberated thereby for heating the fluidized bed. Although DE-OS 28 36 531 discloses a deflection means above the fast fluidized bed, this is neither used for separating solid particles nor for establishing a flowing pulse for generating turbulences in a post-combustion chamber.

According to the invention, low space requirement is achieved by high cross sectional output. The drawback of large construction height is remedied by the arrangement of the deflection means at the upper end of the fast zone. This deflection means further effects a separation of the gas-solids mixture emerging from the fast fluidized bed zone into a flue gas stream and an essentially downwardly oriented solids stream.

The gas stream, which generally still contains free oxygen, emerges from the deflection means at high flowing pulse in approximately horizontal direction, impinges on the pyrolysis gases emerging from the fuel charging zone and mixes with these in a turbulent post-combustion zone. The complete combustion of the pyrolysis gases can thus be achieved within a mean dwell time of 0.1 to 2 seconds.

A frequently applied method for reducing nitrogen oxide emission is the step-wise combustion. In this, the combustion first takes place under reducing conditions. In a second step, combustion takes place under oxidizing conditions. An essential problem in known stationary or internally circulating fluidized bed processes consists in effecting the complete combustion within a reasonable time within the oxidation zone. The limiting factor in this is the mixing of oxygen carrier and uncombusted gases.

For this reason, the step-wise combustion at internal bed circulation is conveniently effected by the addition of the fuel to the slow fluidized zone. This possibility is known, a.o., from EP-A-202 215, although this publication does not disclose any measures for the improvement of the gas mixture.

According to the invention, the fuel charging zone constitutes a drying and pyrolysis zone in which reducing conditions prevail. The zone of the fast fluidized bed serves as a combustion zone in which oxidizing conditions prevail. The gas stream still containing free oxygen leaving this combustion zone, making up for the major part of the total amount of flue gases, is made to pass via the area above the drying and pyrolysis zone where the combustion of the uncombusted gases rising from the reducing zone takes place. As described above, the high turbulence in this post-combustion chamber assures complete mixing and thus complete reaction.

The circulation rate of the bed material can be controlled by changing the distribution volume of the oxygen carrier over the two areas. This allows the regulation of the mean dwell time of the fuel in the pyrolysis zone within wide limits (for instance 5 s to 60 s) and thus an influence on the amount of volatile components liberated here.

It is also possible to control the combustion in the turbulence zone and thus the temperature in the post-combustion chamber. For this purpose, an oxygen carrier gas can be introduced just above the slow fluidized bed, but still within the shower of particles. The heat liberated in a combustion initiated in this manner is transmitted to the shower of particles and thus fed to the fluidized bed. As a result, virtually the entire heat liberated can be fed to the fluidized bed even if highly volatile fuels are used.

The problems connected with the cooling of the fluidized bed also deserve mentioning. In stationary fluidized bed plants, the heating surfaces used for the cooling of the bed are alternately exposed to oxidizing and reducing atmosphere and mechanical abrasion.

The result are serious problems of service life. Further, the transfer of heat to the pipes can be changed only within very narrow limits, which causes difficulties in partial load behavior. In circulating fluidized bed firing, these problems are solved on principle by forming the heating surfaces as wall heating surfaces. The heating surfaces are limited to the upper area of the fluidized bed where exclusively oxidizing conditions prevail. For reasons of fluid dynamics, the abrasive attack of the bed material on the heating surfaces is noticeably reduced. In these types of fluidized beds, a control of heat transfer is possible by changing the gas flow rate in the fluidized bed.

According to the invention, the second zone, the combustion zone, is formed as the fast fluidized bed. This means that the same conditions as in a circulating fluidized bed prevail there, so that the same effects are obtained.

If coarse particles, which mainly consist of inert materials, enter the fluidized bed, they must be removed from the system. According to the process of the invention, this is effected by means of a discharge well provided in the bottom. This can be aerated without reaching the fluidization state. The carbon still contained in the coarse particles removed from the fluidized bed at a temperature of about 800° C. is thus reacted, at the same time, the material withdrawn can be cooled to a temperature of about 200° to 600° C.

If the fluidized bed reactor is to be operated for the pyrolysis of the most diverse materials, the degasification products liberated in the pyrolysis zone can be withdrawn before mixing with the flue gases dicharged from the fast fluidized zone. A better reaction can be achieved by adjusting the circulation rate and by the addition of steam, carbon dioxide or other media promoting gasification instead of air for the fluidization of the slow zone.

Further features and details of the invention are explained in the following under reference to the drawing in which like structural elements bear identical reference symbols.

Figure 1:
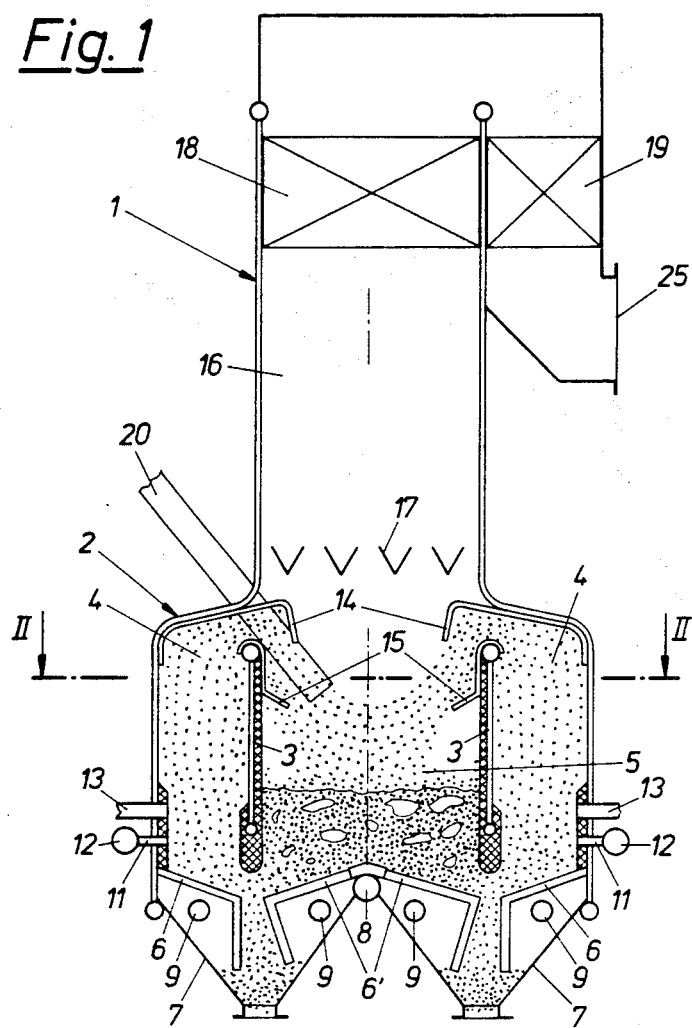
FIG. 1 shows a first embodiment of a fluidized bed reactor in sectional view.
Figure 2:
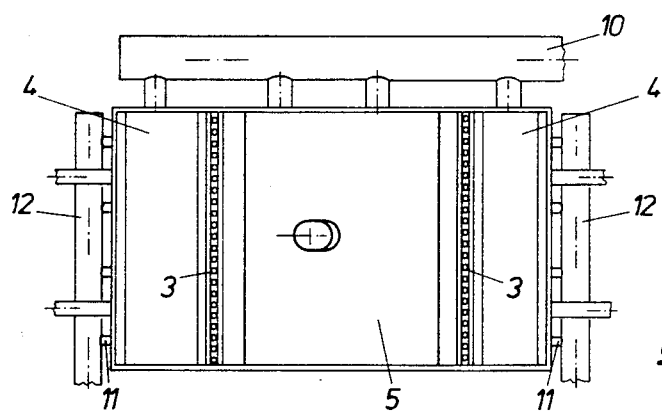
FIG. 2 shows a sectional view along line II—II in FIG. 1.

In FIG. 1, the reference number 1 is used for a fluidized bed reactor with a combustion chamber 2 in the lower part of the reactor; the chamber 2 is divided by two separating walls 3 into two first areas 4 and into one second area 5. The separating walls 3 are preferably formed as heat exchangers, the sides of the separating walls facing the second area 5 are lined with refractory material, while in the first area 4, the separating wall 3 as well as the wall of the combustion chamber 2 are only lined in the lower portion. Symmetrically in relation to the two separating walls 3, perforated plates 6, 6′ forming the bottom of the combustion chamber are disposed underneath the walls 3 inclined downwards, a gap remains between the perforated plates 6,6′ and the respective separating wall 3. The perforated plates 6,6′ are angled downwards so as to form a passage for bed material terminating in an ash hopper 7 provided with a discharge means (not represented) on its lower end. The two central perforated plates 6′ are attached to a supporting pipe 8. Air chambers connected to a first feed line 10 via connecting pipes 9 are formed underneath the inclined part of the perforated plates 6,6′ (FIG. 2). Lateral air supply pipes 11 connected to a second feed line 12 are provided above the lateral perforated plates 6. Nozzles 13 are provided for charging liquid, pasty or gaseous fuels above the air supply pipes 11. Downwardly directed deflection plates 14 serving as baffle separators together with baffles 15 disposed underneath, as explained in the following, are attached above the separating walls 3 on the wall of the combustion chamber 2. Wear plates can be attached to the deflection plates 14 and 15. The combustion chamber 2 extends upwards as a post-combustion chamber 16 in which V-shaped turbulators 17 optionally formed as heat exchangers are provided. Heat exchanger elements 18 and 19 are installed at the outlet of the post-combustion chamber 16. The walls of the combustion chamber 2 and the post-combustion chamber 16 are preferably formed as channel walls, i.e. cooled, the post-combustion chamber 16 may be operated without cooling under certain conditions. Solid fuels are preferably introduced via a fall pipe 20 oriented in the direction of the center of the second area 5 of the combustion chamber 2.

Figure 3:
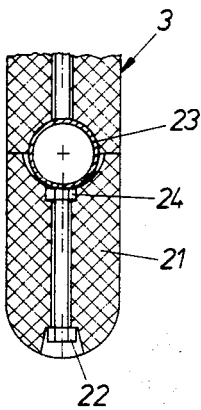
FIG. 3 shows a detail of FIG. 1 in enlarged scale.

FIG. 3 shows that the form part 21 of the refractory lining of the separating walls 3 may be attached exchangeably. This is done by means of a screw 22 screwed into a nut 24 welded to a pipe 23 of the separating wall 3, the screw head supporting the form part 21.

In the operation of the reactor 1, the second area 5 is fluidized via the perforated plates 6′ so that a fixed slow fluidized bed is formed, while the first areas 4 are fluidized via the lateral perforated plates 6 and additionally via the lateral air supply pipes 11 in such a way that a fast fluidized bed forms. The bed material flows from the second area 5 via the gap between the perforated plates 6 and 6′ and the separating wall 3 to the first areas 4, is lifted up there and recirculated to the second area 5 via the gap between the separating walls 3 and the deflection plates 14.

The high lateral pulse of the transporting air causes increased turbulence above the slow fluidized bed in the area 5 downstream of the deflection plates 14, 15 in the post-combustion chamber 16. The separated bed material causes a shower of particles above the slow fluidized bed in the area 5 Since the material to be processed is supplied via the fall pipe 20 into the space above the dense, slow fluidized bed, it will be covered up by the shower of particles and submerge more easily into the dense, slow fluidized bed. Characteristic parameters for the process and the operation of the reactor 1 are the surface ratios of the cross sectional surfaces of the first and second areas 4 and 5 and the fluidization rates in these areas. Due to the particular construction of the combustion chamber 2, the drying, pyrolysis and combustion zones can be separated.

The exhaust gases from the post-combustion turbulence zone 16 are withdrawn from the reactor 1 at 25 after passing the heat exchangers 18 and 19, optionally via conventional dust filter.

FIG. 1 shows only one fall pipe 20; it goes without saying, however, that symmetrical charging via two fall pipes or other charging means is possible. It is essential that charging is directed into the shower of particles so that the material charged absorbs heat during the fall and is continuously dumped and mixed into the slow fluidized bed through the shower of particles.

FIG. 4 to 7 show a variant of a reactor 1 having only one separating wall 3. The aeration of the first, slow area 4 is effected via a feed line 10 and pipes 9 which do not feed any air chambers, but terminate directly in the interior of the reactor and generate a free jet directed to the fast area 5 underneath the separating wall 3. The pipes 9 are straight and cut off bluntly or provided with a siphon knee in order to prevent backflow of bed material into the pipes 9 or their feed line 10.

Figure 4:
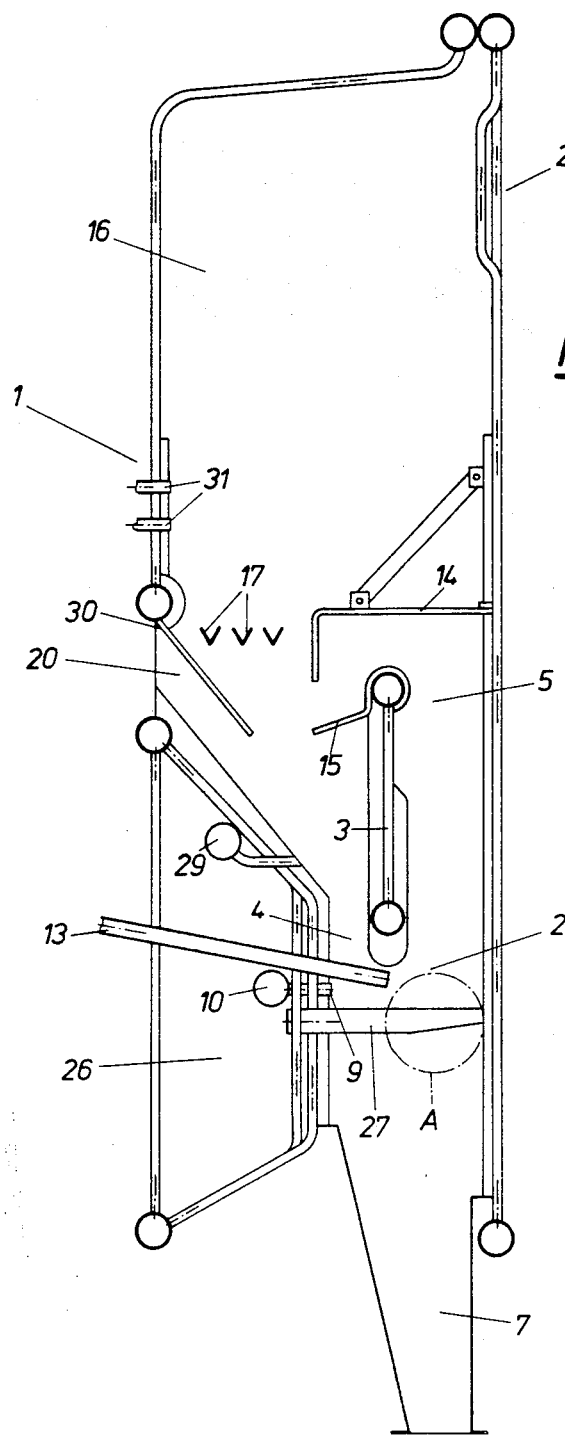
FIG. 4 shows a second embodiment of a fluidized bed reactor.
Figure 5:
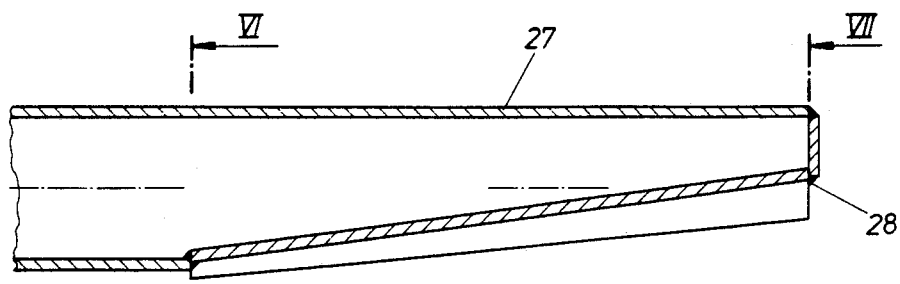
FIG. 5 to 7 show enlarged details of FIG. 4.
Figure 6:
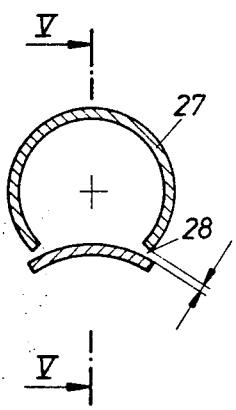
Figure 7:
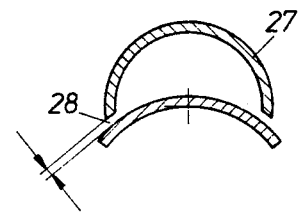

Moreover, the fluidization of the fast area 5 is not effected via perforated plates 6 as in the case of the embodiment according to FIG. 1, but instead via a lateral air chamber 26 which is connected to a horizontal pipe grid made up of pipes 27 extending from underneath the slow area 4 at a distance underneath the separating wall 3 into the fast area 5 and are provided underneath the area 5—this is the area A in FIG. 4 and shown in detail in FIG. 5 to 7—on both sides with oblique air outlet slits 28 forming air curtains oriented laterally downwards in the direction of the ash hopper 7.

The fuel inlet 13, which mainly serves for the supply of gaseous, liquid or pasty fuels and is fed in autothermal processes only for starting the reactor, is formed as a lance whose discharge opening is disposed underneath the separating wall 3.

The fall pipe 20 is formed as a chute provided with an inlet 29 for an oxygen carrier gas (e.g. secondary air) in its lower area above the slow fluidized bed and its upper wall is formed as such an inlet 30. The inlets 29 and 30 can also be provided alternately. Above the turbulators 17, a set of nozzles 31 is provided in the side wall of the reactor 1 for the optional injection of further oxygen carrier gas (tertiary air) for the support of post-combustion and $NO_x$ minimation in the post-combustion turbulence zone 16.

The reactor according to FIG. 4 can be doubled in a back-to-back mirror image construction in which the wall carrying the gas outlet 25 would then constitute the central wall and the plane of symmetry. The gas outlets 25 would then be provided in another side wall. It would also be possible to provide a common single post-combustion turbulence zone 16.

The slow area 4 of the reactor 1, i.e. the drying and pyrolysis zone, is advantageously operated at rates within the range of about 0.2 to about 1.0 m sec$^{-1}$; the rates in the fast area 5 of the reactor, i.e. in the combustion zone, depending on the load conveniently range from about 2.0 to about 12.0 m sec$^{-1}$. A further determining parameter of the process according to the invention is the bed material circulation which, as already mentioned, conveniently ranges from about 20 to about 200 kg m$^{-2}$ sec$^{-1}$ based on the cross sectional surface of the fast area 5 and is selected particuarly preferred to be 50 to 70 kg m$^{-2}$ sec$^{-1}$.

It is obvious that the various parameters are linked to one another and must be adjusted a.o. to the particular fuels by means of which the reactor 1 is operated.

A large number of reactors for carrying out combustion processes in fluidized beds is known. An essential requirement for the suitability of the fluidized bed reactor for carrying out the process according to the invention, in addition to the possibility of charging the fuel into the shower of particles of circulating bed material, is that the separate guidance means of the fast fluidized bed is of an appropriate length, so that the solids in the combustion zone can be conveyed upwards in the drying and pyrolysis zone preferably to two to twenty times the bed height.

Accordingly, a fluidized bed combustion reactor with a fast combustion zone with solids particle free fall deflection into a slow bed material recirculating zone, such as it is described, for instance, in DE-OS 27 36 493, is characterized according to the invention in that the fuel inlet is provided in the bed material free fall zone.

It is further of advantage to provide a guidance means for the fast combustion zone whose height is two to twenty times higher than the height of the bed material recirculation zone.

A further characterizing feature of a reactor according to the invention is that the cross sectional ratio of combustion zone to bed material recirculation zone ranges from about 1 : 1 to about 5 : 1. The cross sectional ratio is usually measured on the lower end of the separating wall 3.

The applicant has carried out pilot tests in a plant which approximately corresponds to FIG. 4, with separating walls of a height between 1.7 to 2.0 m between combustion zone and drying and pyrolysis zone; the free cross sectional area of the plant in the post-combustion zone 16 extended over 0.48 m$^2$ and the total construction height to 6 m. The cross sectional area of the fast zone 5 extended over 0.13 m$^2$, the cross sectional area of the slow zone 4 over 0.1 m$^2$. The plant was operated with 200 kg of bed material.

Some of the results obtained in the tests are summarized in the following table.

| | fuel amount (kg/h) | combustion air | | | fluid.bed temperat. (°C.) | emission | | |
|---|---|---|---|---|---|---|---|---|
| | | slow bed (Nm$^3$/h) | fast bed (Nm$^3$/h) | air above bed (Nm$^3$/h) | | CO (mg/Nm$^3$)* | NO$_x$ (mg/Nm$^3$)* | O$_2$ (%) |
| garbage | 190 | 30 | 700 | 60 | 820 | 35 | 215 | 5.8 |
| rejects** | 270 | 30 | 700 | 90 | 780 | 40 | 190 | 6.1 |
| wood | 170 | 30 | 700 | — | 840 | 35 | 220 | 5.4 |

-continued

| | | combustion air | | | fluid.bed | emission | | |
| | fuel amount (kg/h) | slow bed (Nm³/h) | fast bed (Nm³/h) | air above bed (Nm³/h) | temperat. (°C.) | CO (mg/Nm³)* | NO$_x$ | O$_2$ (%) |
|---|---|---|---|---|---|---|---|---|
| brown coal | 200 | 30 | 700 | — | 860 | 35 | 170 | 5.5 |

*based on 11% O$_2$
**from the paper industry, consisting mainly of plastic material scraps + cellulosic fibers

| | Heat energy liberation in percent | | |
| fuel | area 4 | area 5 | post-combustion chamber 16 |
|---|---|---|---|
| brown coal | 13–20 | 60–70 | 17–22 |
| wood | 10–15 | 50–60 | 27–35 |
| BRAM² | 8–15 | 45–55 | 35–40 |
| rejects | 11–17 | 50–60 | 23–29 |
| sewage sludge | 13–18 | 60–65 | 20–25 |

²unpelletized fuel consisting of garbage

Operation of the process according to the invention is started in a conventional manner by charging the reactor with the usual bed material, for instance quartz sand, and bringing it up to the required temperature with conventional secondary fuel such as gas or oil. The fuel proper is not metered in until then, fluctuations in its calorific value being compensated by regulation of the heat exchangers and/or temporary addition of secondary fuel.

What is claimed is:

1. A fluidized bed process for gasification and combustion of fuel in separate and differently fluidized bed zones, comprising:
   charging the fuel in a drying and pyrolysis zone having relatively lower fluidization with solids being transported downwardly;
   conveying said solids from a lower area of said drying and pyrolysis zone to a lower area of a combustion zone having relatively higher fluidization with solids being transported upwardly;
   operating said combustion zone as a fast or turbulent fluidized bed;
   conveying said solids upwardly in said combustion zone beyond the height of a bed in said drying and pyrolysis zone;
   recirculating and forcibly deflecting said solids from the upper area of said combustion zone downwardly toward said bed in said drying and pyrolysis zone as a shower of solid particles;
   directly metering the fuel into said shower of particles;
   passing gases emerging from said combustion zone as a flowing pulse into a turbulence zone in which post-combustion is carried out; and
   adjusting the temperature in said post-combustion turbulence zone by controlling distribution of the total amount of fluidization gas over said combustion zone and said drying and pyrolysis zone.

2. A process according to claim 1, further comprising:
   withdrawing gases emerging from said drying and pyrolysis zone prior to their mixing with gases emerging from said combustion zone.

3. A process according to claim 1, wherein said operating step comprises operating said fluidized bed in said combustion zone with a fluidization number of from 70 to 140.

4. A process according to claim 1 wherein said second conveying step comprises conveying said solids upwardly from two to twenty times the height of said bed in said drying and pyrolysis zone.

5. A process according to claim 1 wherein said deflecting step further comprises deflecting said solids relatively horizontally over said bed.

6. A fluidized bed process for gasification and combustion of fuel in separate and differently fluidized bed zones, comprising:
   charging the fuel in a drying and pyrolysis zone having relatively lower fluidization with solids being transported downwardly;
   conveying said solids from a lower area of said drying and pyrolysis zone to a lower area of a combustion zone having relatively higher fluidization with solids being transported upwardly;
   operating said combustion zone as a fast or turbulent fluidized bed;
   conveying said solids upwardly in said combustion zone beyond the height of a bed in said drying and pyrolysis zone;
   recirculating and forcibly deflecting said solids from the upper area of said combustion zone downwardly toward said bed in said drying and pyrolysis zone as a shower of solid particles;
   directly metering the fuel into said shower of particles;
   passing gases emerging from said combustion zone as a flowing pulse into a turbulence zone in which post-combustion is carried out; and
   controlling the temperature in said post-combustion turbulence zone by adding an oxygen carrier gas in the area of said shower of particles.

7. A process according to claim 6, further comprising:
   withdrawing gases emerging from said drying and pyrolysis zone prior to their mixing with gases emerging from said combustion zone.

8. A process according to claim 6, wherein said operating step comprises operating said fluidized bed in said combustion zone with a fluidization number of from 70 to 140.

9. A process according to claim 6 wherein said second conveying step comprises conveying said solids upwardly from two to twenty times the height of said bed in said drying and pyrolysis zone.

10. A process according to claim 6 wherein said deflecting step further comprises deflecting said solids relatively horizontally over said bed.

11. An apparatus for carrying out a fluidized bed process, comprising:
    a fluidized bed reactor having a combustion chamber and a post-combustion chamber, said combustion chamber being divided into a less fluidized fuel feed zone and a more fluidized combustion zone;
    an upstanding partition positioned between said zones and forming a passage between said fuel feed zone and said combustion zone to allow solids to pass from said fuel feed zone to said combustion zone, said partition having a height extending above said fuel feed zone;

first deflector means, provided at the upper end of said combustion zone, for deflecting rising solids in said combustion zone to drop into said fuel feed zone as a shower; and fuel feed means, extending into said fuel feed zone, for directly metering fuel into said shower, said deflector means in said fuel feed zone turbulently deflecting combustion gases into the lower part of said post-combustion chamber.

12. An apparatus according to claim 11, further comprising:

turbulence-generating baffle plates located in the lower part of said post-combustion chamber.

* * * * *